April 12, 1927. 1,624,188
R. SIMON
DEVICE FOR LAUNCHING AND LANDING AIRPLANES FROM AND UPON SUSPENDED POSITIONS
Filed June 13, 1925 2 Sheets-Sheet 1
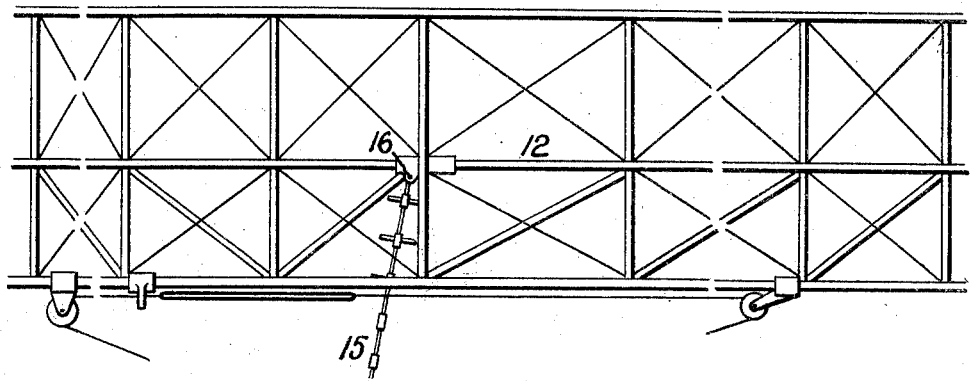
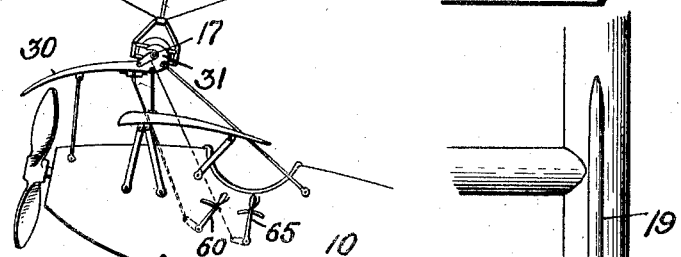
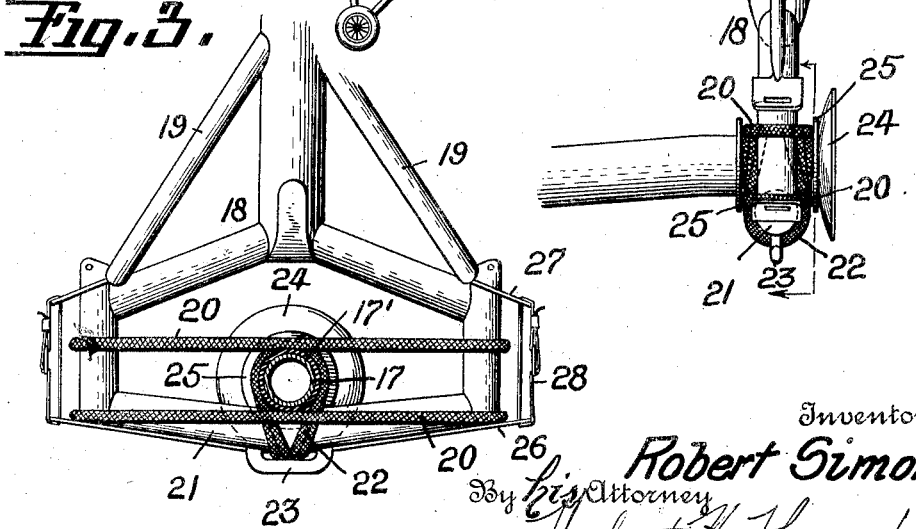
Inventor
Robert Simon.
By his Attorney
Herbert H. Thompson

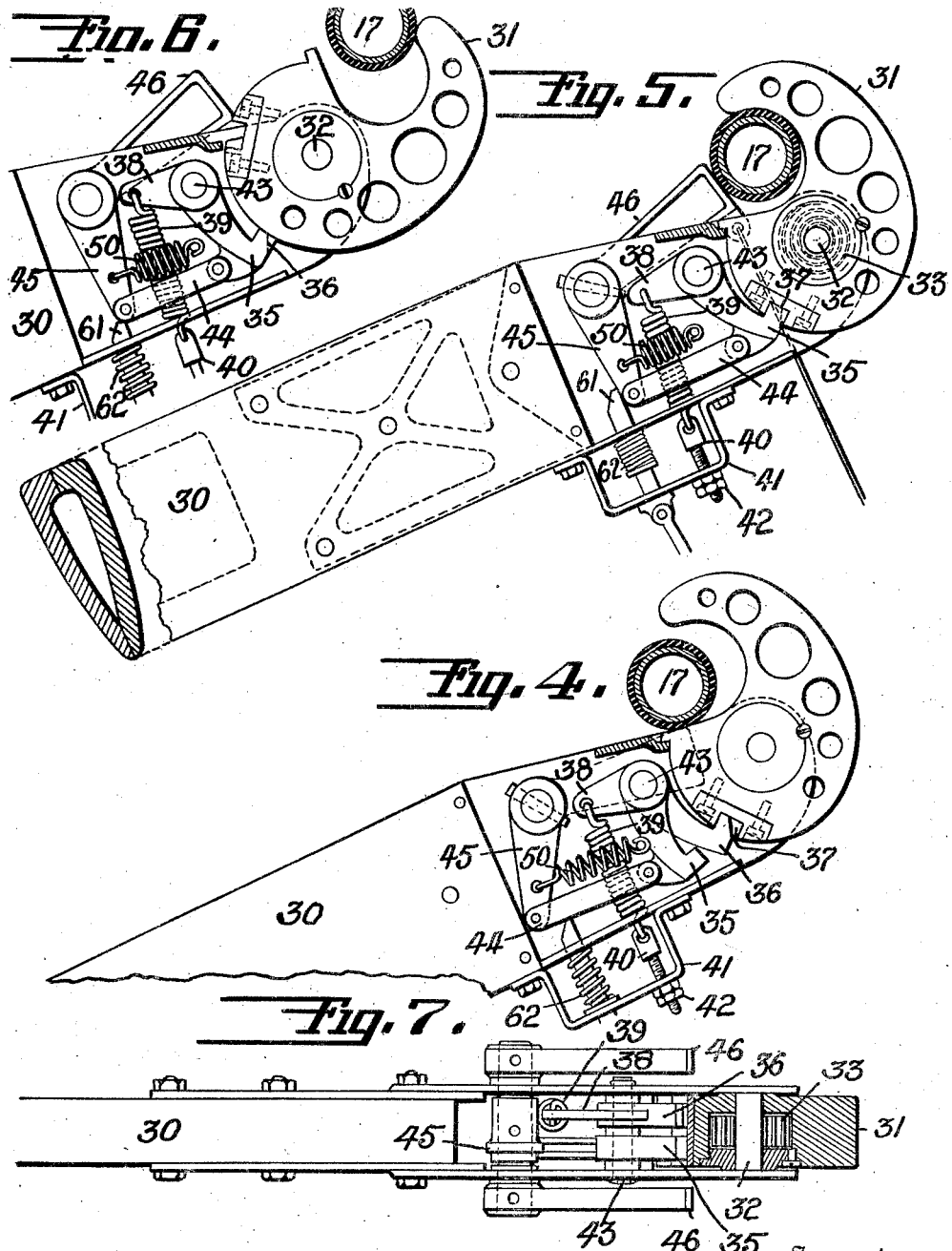

Patented Apr. 12, 1927.

1,624,188

UNITED STATES PATENT OFFICE.

ROBERT SIMON, OF FARMINGDALE, NEW YORK, ASSIGNOR TO THE LAWRENCE SPERRY AIRCRAFT COMPANY, OF FARMINGDALE, NEW YORK, A CORPORATION OF NEW YORK.

DEVICE FOR LAUNCHING AND LANDING AIRPLANES FROM AND UPON SUSPENDED POSITIONS.

Application filed June 13, 1925. Serial No. 36,776.

This invention relates to means whereby aircraft may be landed upon or launched from suspended positions. More particularly this invention relates to means whereby an aircraft may be landed upon or launched from some other aircraft, such as a dirigible balloon, etc.

The invention is in the nature of an improvement of the launching and landing device disclosed in the application of Lawrence B. Sperry, Serial #571,252 filed June 27, 1922, assigned to the same assignee as this invention and the broader claims being reserved for said prior application.

In said application, the aircraft was adapted to engage a member in the form of a trapeze bar suspended from a supporting aircraft. There is, however, danger especially where the airplane, which is to be suspended, is travelling at high speed that damage to the suspension apparatus may result even where the cushioning and recoil means, described in said application, are employed. It is the principal object of this invention, therefore, to provide safety means whereby engagement of the aircraft to be suspended on the supporting means can take place only when the said aircraft is travelling within certain predetermined speed limits, relative to the speed of the supporting craft, or stated a different way, engagement will take place only when the aircraft to be suspended strikes the suspension mechanism with less than a certain predetermined force. When this force is exceeded my invention provides safety means whereby the aircraft is automatically released from the suspension means so that no engagement takes place.

It is a further object of my invention to provide suitable locking means for the suspended aircraft to prevent accidental or unintentional disengagement thereof from its suspended position.

A further object of my invention is the provision of suspension means having shock absorbing means for taking up the shock incident to the engagement of the aircraft with the said suspension mechanism.

Other objects and advantages of this invention will become apparent in the following description thereof.

In the accompanying drawings—

Fig. 1 is a perspective view, with parts broken away, showing one aircraft suspended from a second aircraft, the suspension mechanism embodying my invention.

Fig. 2 is an enlarged detail giving a front elevation of a shock absorbing means forming part of the construction of the suspension mechanism.

Fig. 3 is an end elevation of the mechanism shown in Fig. 2.

Fig. 4 is an enlarged detail view showing the engaging mechanism on the aircraft about to engage the supporting bar of the suspension mechanism.

Fig. 5 is a view similar to Fig. 4 and showing the parts when the aircraft is fully engaged by the suspension mechanism.

Fig. 6 is a view similar to Figs. 4 and 5 but showing the operation of the engaging mechanism when the aircraft is travelling at above a predetermined speed relative to the suspension means or when the engaging means on said aircraft strikes the suspension means with greater than a predetermined force.

Fig. 7 is a plan view of the suspension means disclosed in Figs. 4 to 6.

Referring to the drawings, Fig. 1 discloses a heavier-than-air craft 10 engaging a suspension indicated generally at 11 suspended from some supporting means, which in this instance, is shown as the carriage 12 of a dirigible. It will be understood that for the purposes of my invention the suspension mechanism 11 may be supported from any other suspended position, as for example from a balloon or from a second heavier-than-aircraft or from a mooring mast. The suspension may be in the form of a trapeze including an elongated member 15 pivoted upon the support at 16 so as to be free to swing about said pivot and provided at its lower end with a cross bar or trapeze bar 17 adapted to be engaged by the craft to be supported.

Said trapeze bar 17 may be surrounded by a rubber casing or tube 17′ and is resiliently supported within a frame shown in Fig. 3 so that it is capable of moving in the direction of travel of the craft 10. The said support may comprise the frame 18 suitably braced at 19 and having resilient guide members 20 within which operates the said bar 17. Said bar is supported upon the lower rung 21 of said frame 18 and within the guides 20 by resilient members 22, held by a member 23 fixed to rung 21, so as to tend to maintain said bar in the central portion of bar 21 and against vertical movement. It will be apparent that when the craft 10 engages bar 17, it will tend to drag said bar rearwardly along the guides 20 but as soon as the force of engagement has been relaxed the resilient members 23 will draw said bar 17 back to its original position. In this manner a suitable shock absorbing means is provided in the engagement mechanism. The bar 17 may be held against axial movement in any suitable manner as by flanges 24. The resilient bands 20 and 22 may be held against movement axially of bar 17 by means such as flanges 25, while the bands 20 may be prevented from slipping off the frame by means such as metal extensions 26, 27 connected by straps 28.

The engaging means carried by the aircraft may be to a certain extent similar to that disclosed in the said Sperry application in that it is provided with a guide member 30 supported on the body of the craft and having a member projecting forwardly over the fan to prevent said propeller fan from striking the suspension mechanism. The craft 10 is so directed that the guide 30 strikes the suspension mechanism at, preferably, the trapeze bar 17, so that the latter is guided upwardly therealong until it engages a hook 31 forming an extension of said guide 30. The hook 31, however, is not fixedly connected to the guide 30 but is pivotally mounted about a pivotal axis 32 so that if the force with which hook 31 engages bar 17 is in excess of a predetermined degree, the said hook can swing rearwardly to disengage the supporting mechanism. This is accomplished by the following structure.

The hook 31 is connected to the fixed pivotal axis 32 by a coil spring 33 which normally maintains the hook in the position shown in Fig. 4. Said hook 31 is maintained in the said normal position by the coil spring 33 and is locked in said position by two locking pawls, a positive locking pawl 35 and a cam locking pawl 36 engaging in a slot 37 formed in said hook 31. The cam locking pawl 36 forms one arm of a bell-crank 38 to the other arm of which is attached a spring 39. The free end of said spring engages an adjustable member 40 extending through a bracket 41 and adjustable by means of a set of locking nuts 42 to adjust the tension of said spring 39. Spring 39, therefore, maintains the cam pawl 36 in said slot with an adjustable tension. Positive pawl 35 is pivoted at 43 and has pivoted to its other end, one end of link 44 which is connected to a bell crank 45, the other arm of which is in the form of a trigger 46 normally extending upwardly into the path of travel of bar 17 into said hook as shown in Fig. 5. A spring 50 normally maintains the said trigger in its upward position and at the same time maintains the positive locking pawl 35 within said slot 37. It will thus be apparent that when trigger 46 is depressed due to the passing of trapeze bar 17 thereover, locking pawl 35 will be withdrawn from the slot 37 until said bar 17 has passed over said trigger. Then said trigger will rise behind bar 17 to enclose said bar in said hook and the locking pawl 35 will again engage the slot 17 to prevent rearward movement of the hook 31.

When the trapeze bar 17 has been engaged by hook 31 accidental withdrawal of locking pawl 35 may be prevented by the operator actuating a handle 60 for moving upwardly a detent 61, normally pressed downwardly to inoperative position by spring 62, said detent 61 engaging behind link 44 to prevent rearward movement thereof.

The mechanism hereinbefore described will prevent engagement of the craft 10 with the suspension mechanism when the craft is travelling at a speed which would cause it to strike the said suspension mechanism with too great a force. This operation may be described as follows: The locking pawl 35 has a certain distance to travel before engaging the slot 37. There is, however, very little free play between trapeze bar 17 and the trigger 46 and hook 31. If the craft 10 is travelling at too great a speed, hook 31 will strike bar 17 with such great force as to swing the hook back in a counterclockwise direction (in the figures) to cam the cam pawl 36 out of the slot 37 before positive pawl 35 has reached the said slot. Slot 37, therefore, passes beyond the locking pawl as shown in Fig. 6 so that hook 31 is free to rotate relative to bar 17 until said bar has passed beyond said hook. Coil spring 33 then returns the parts to their normal position shown in Fig. 5 without, however, engaging the trapeze bar.

When the trapeze bar has been engaged in normal operation, it will be seen that the said trapeze bar is held against disengagement by the two locking pawls, the trigger 46 and the detent 61. In order to release the craft 10 from the suspension, it is only necessary for the operator to actuate handle 60 to withdraw pawl 61 and then actuate a second handle 65 to swing the trigger 46 downwardly out of the path of bar 17. The latter movement will, of course, also withdraw the positive locking pawl 35 and the weight of craft 10 will then be sufficient to swing hook 31 about its pivot 32 and cam outwardly the cam detent 36 to permit the craft 10 to disengage the said bar 17 as shown in Fig. 6.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device for launching and landing airplanes, the combination of means for supporting an airplane, means carried by said airplane for engaging said supporting means during flight, and means whereby said last-named means is rendered ineffective when the force of engagement of said aircraft with said supporting means is in excess of a predetermined degree.

2. In a device for launching and landing airplanes, the combination of means for supporting an airplane, means carried by said airplane for engaging said supporting means during flight, and means including delayed-action means whereby said last-named means is rendered ineffective when the force of engagement of said aircraft with said supporting means is in excess of a predetermined degree.

3. In a device for launching and landing airplanes, the combination of means for supporting an airplane, means carried by said airplane for engaging said supporting means during flight, and means including a yielding mounting for said engaging means whereby said last-named means is rendered ineffective when the force of engagement of said aircraft with said supporting means is in excess of a predetermined degree.

4. In a device for launching and landing airplanes, the combination of means for supporting an airplane, means carried by said airplane for engaging said supporting means during flight, means for locking said supporting means in said engaging means, and means for rendering said last-named means ineffective when the force of engagement of said aircraft with said supporting means is in excess of a predetermined degree.

5. In a device for launching and landing airplanes, the combination of means for supporting an airplane, means carried by said airplane for engaging said supporting means during flight, a yielding mounting for said engaging means, and means normally holding said engaging means against yielding movement.

6. In a device for launching and landing airplanes, the combination of means for supporting an airplane, means carried by said airplane for engaging said supporting means during flight, a yielding mounting for said engaging means, and means normally opposing with a predetermined force yielding of said engaging means but adapted to permit yielding thereof when said aircraft engages said supporting means with a force exceeding said predetermined force.

7. In a device for launching and landing airplanes, the combination of means for supporting an airplane, means carried by said airplane for engaging said supporting means during flight, a yielding mounting for said engaging means, and means normally opposing with a predetermined force yielding of said engaging means but adapted to permit yielding thereof when said aircraft engages said supporting means with a force exceeding said predetermined force, said last-named means including a cam detent, said engaging means having a slot for receiving said detent and a spring for maintaining said detent in said slot with said predetermined force.

8. In a device for launching and landing airplanes, the combination of means for supporting an airplane, means carried by said airplane for engaging said supporting means during flight, a yielding mounting for said engaging means, means normally opposing with a predetermined force yielding of said engaging means but adapted to permit yielding thereof when said aircraft engages said supporting means with a force exceeding said predetermined force, said last-named means including a cam detent, said engaging means having a slot for receiving said detent, a spring for maintaining said detent in said slot with said predetermined force, and means whereby the tension of said spring may be varied to vary said force.

9. In a device for launching and landing airplanes, the combination of means for supporting an airplane, means carried by said airplane for engaging said supporting means during flight, a yielding mounting for said engaging means, and a positive lock and a yielding lock for normally holding said engaging means against yielding movement.

10. In a device for launching and landing airplanes, the combination of means for supporting an airplane, means carried by said airplane for engaging said supporting means during flight, a mounting for said engaging means capable of yielding to a sufficient degree to release said supporting means, and means whereby yielding of said mounting is opposed by a predetermined force.

11. In a device for launching and landing airplanes, the combination of means for supporting an airplane, means carried by said airplane for engaging said supporting means during flight, means whereby yielding of said mounting is opposed by a predetermined force, and means whereby said force may be varied.

12. In a device for launching and landing airplanes, the combination of means for supporting an airplane, means carried by said airplane for engaging said supporting means during flight, means whereby yielding of said mounting is opposed by a predetermined force, a positive lock for normally holding said engaging means against yielding movement, and means whereby said positive lock is rendered ineffective by the act of engagement of said engaging means with said supporting means.

13. In a device for launching and landing airplanes, the combination of means for supporting an airplane, means carried by said airplane for engaging said supporting means during flight, means whereby yielding of said mounting is opposed by a predetermined force, a positive lock for normally holding said engaging means against yielding movement, means whereby said positive lock is rendered ineffective by the act of engagement of said engaging means with said supporting means, and delayed-action means whereby said lock is operated toward effective position after said engagement is effected.

14. In a device for launching and landing airplanes, the combination of means for supporting an airplane, means carried by said airplane for engaging said supporting means during flight, means whereby yielding of said mounting is opposed by a predetermined force, a positive lock for normally holding said engaging means against yielding movement, means whereby said positive lock is rendered ineffective by the act of engagement of said engaging means with said supporting means, delayed-action means whereby said lock is operated toward effective position after said engagement is effected, and means whereby engagement of said engaging means and said supporting means with said predetermined force maintains said lock ineffective.

15. In a device for launching and landing airplanes, the combination of means for supporting an airplane, means carried by said airplane for engaging said supporting means during flight, a yielding mounting for said engaging means, means whereby yielding of said mounting is opposed by a predetermined force, a positive lock for normally holding said engaging means against yielding movement, and manual means whereby said lock may be actuated to ineffective position.

16. In a device for launching and landing airplanes, the combination of means for supporting an airplane, means carried by said airplane for engaging said supporting means during flight, a yielding mounting for said engaging means, means whereby yielding of said mounting is opposed by a predetermined force, a positive lock for normally holding said engaging means against yielding movement, manual means whereby said lock may be actuated to ineffective position, and means for preventing actuation of said lock to ineffective position.

17. In a device for launching and landing airplanes, the combination of means for supporting an airplane, means carried by said airplane for engaging said supporting means during flight, means whereby yielding of said mounting is opposed by a predetermined force, a positive lock for normally holding said engaging means against yielding movement, means whereby said positive lock is rendered ineffective by the act of engagement of said engaging means with said supporting means, delayed-action means whereby said lock is operated toward effective position after said engagement is effected, and manually operable means for preventing rendering said positive lock ineffective.

18. In a device for launching and landing airplanes, the combination of means for supporting an airplane, a pivotally mounted hook carried by said airplane for engaging said supporting means and movable to effective and ineffective positions, and means for opposing with a predetermined force the movement of said hook to ineffective position.

19. In a device for launching and landing airplanes, the combination of means for supporting an airplane, a latch carried by said airplane and operable to effective and ineffective positions, means normally maintaining said latch in effective position, and means whereby said latch is actuated to ineffective position in response to a predetermined force applied to said latch by said supporting means.

20. In a device for launching and landing airplanes, the combination of means for supporting an airplane, a latch carried by said airplane and operable to engaging and disengaging positions, means normally maintaining said latch in engaging position, and means whereby said latch is operated to disengaging position in response to a predetermined force of engagement of said latch with said supporting means.

21. In a device for launching and landing airplanes, the combination of means for supporting an airplane, a latch carried by said airplane and operable to effective and ineffective positions, means normally maintaining said latch in effective position, and means whereby said latch is actuated to ineffective position in response to a predetermined force applied to said latch by said supporting means, said last-named means including positive locking means normally engaging said latch to prevent movement thereof to ineffective position, means whereby said locking means is rendered ineffective by said supporting means, delayed-action means whereby said supporting means is adapted to release said locking means after engagement of said supporting means with said latch, and means whereby engagement of said supporting means and said latch with said predetermined force maintains said locking means ineffective.

22. In a device for launching and landing aircraft, the combination of means for supporting an aircraft, said means including a yielding member, and yielding means carried by said aircraft for engaging said member and capable of yielding to a degree sufficient to release said supporting means.

23. In a device for launching and landing aircraft, the combination of means for supporting an aircraft, said means including a shock absorbing member, and yielding means carried by said aircraft for engaging said member and capable of yielding to a degree sufficient to release said supporting means.

In testimony whereof I have affixed my signature.

ROBERT SIMON.